(12) United States Patent
Meyer

(10) Patent No.: US 6,935,299 B2
(45) Date of Patent: Aug. 30, 2005

(54) SPRING-SUPPORTED CRANKSHAFT COUPLING STRUCTURE FOR ENGINE

(76) Inventor: Siegfried Meyer, Spitalgasse 1, 86732 Oettingen (DE)

(*) Notice: Subject to any disclaimer, the term of this patent is extended or adjusted under 35 U.S.C. 154(b) by 0 days.

(21) Appl. No.: 10/772,456

(22) Filed: Feb. 6, 2004

(65) Prior Publication Data

US 2004/0187837 A1 Sep. 30, 2004

Related U.S. Application Data

(60) Provisional application No. 60/457,302, filed on Mar. 26, 2003.

(51) Int. Cl.$^7$ ................................................ F02B 75/32
(52) U.S. Cl. .................... 123/197.1; 123/197.2
(58) Field of Search ............... 123/48 B, 197.1, 123/197.2, 197.3, 197.4

(56) References Cited

U.S. PATENT DOCUMENTS 6,223,703 B1 * 5/2001 Galvin ..................... 123/48 B

FOREIGN PATENT DOCUMENTS

JP 03085307 A * 4/1991 ............. F01L/7/04

OTHER PUBLICATIONS

WO 85/01312 Mar. 1985, Polesy et al.*

* cited by examiner

Primary Examiner—Noah P. Kamen
(74) Attorney, Agent, or Firm—Rosenberg, Klein & Lee (57) ABSTRACT

A spring-supported crankshaft coupling structure used in an engine and coupled between a piston and a crankshaft to enhance the output torque of the engine is disclosed to include a connector axially movably coupled to the piston by a slip joint, a stop device fixedly fastened to the piston to limit the moving distance of the connector relative to the piston, a spring member mounted in the piston and adapted to impart a downward pressure to the connector, and a connecting rod adapted to couple the connector to the crankshaft.

2 Claims, 8 Drawing Sheets

SPRING-SUPPORTED CRANKSHAFT COUPLING STRUCTURE FOR ENGINE

This application claims the benefit of provisional application No. 60/457,302, filed Mar. 26, 2003.

BACKGROUND OF THE INVENTION

1. Field of the Invention

The present invention relates to an internal combustion end and, more specifically, to a spring-supported crankshaft coupling structure for use in an engine to connect a crankshaft to a piston and to increase the output torque of the engine.

2. Description of the Related Art

In a typical internal combustion engine, of the type found in most vehicles today, a plurality of pistons are respectively movably mounted in a plurality of cylinders formed in an engine block. Each of the pistons has one end connected with a piston rod and the other end coupled to a crankshaft. When spark plugs in the engine block fired to ignite fuel mixture, the pistons are driven downward to turn the crankshaft, which ultimately drives the entire vehicle. At present, in a typical engine, connecting rods are used and connected with the respective first end to the corresponding piston and the respective second end to the corresponding crankshaft. The connecting points between the two ends of each connecting rod and the corresponding piston and corresponding crankshaft are disposed at the ends of the longitudinal center axis of the respective connecting rod. By means of the coupling of the connecting rod between the corresponding piston and the corresponding crankshaft, reciprocating motion of the piston causes the corresponding crankshaft to rotate.

Presently, researchers have reported many studies to enhance the output torque by extending the moving distance of the connecting rods between the pistons and the crankshafts.

SUMMARY OF THE INVENTION

The present invention has been accomplished under the circumstances in view. It is one object of the present invention to provide a crankshaft coupling structure for engine, which greatly enhances the output torque of the engine.

It is another object of the present invention to provide a crankshaft coupling structure for use engine, which saves fuel consumption of the engine.

It is still another object of the present invention to provide a crankshaft coupling structure for engine, which improves the performance of the engine, resulting in reduced amount of solid matter in exhaust gas of the engine.

To achieve these and other objects of the present invention, the crankshaft coupling structure is used in an engine and coupled between a piston and a crankshaft to enhance the output torque of the engine, comprising: a connector mounted in the piston and axially movable relative to the piston coupled to the piston within a limited distance; a slip joint adapted to couple the connector to the piston; a spring member mounted inside the piston and adapted to impart a pressure to the connector in axial direction toward a bottom side of the piston; a fixed stop device fixedly provided in the piston and adapted to limit the movement of the connector relative to the piston to a predetermined distance; and a connecting rod, the connecting rod having a top end pivoted to the connector and a bottom end pivoted to the crankshaft.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers are used in the drawings and the description to refer to the same or like parts.

Figure 1:
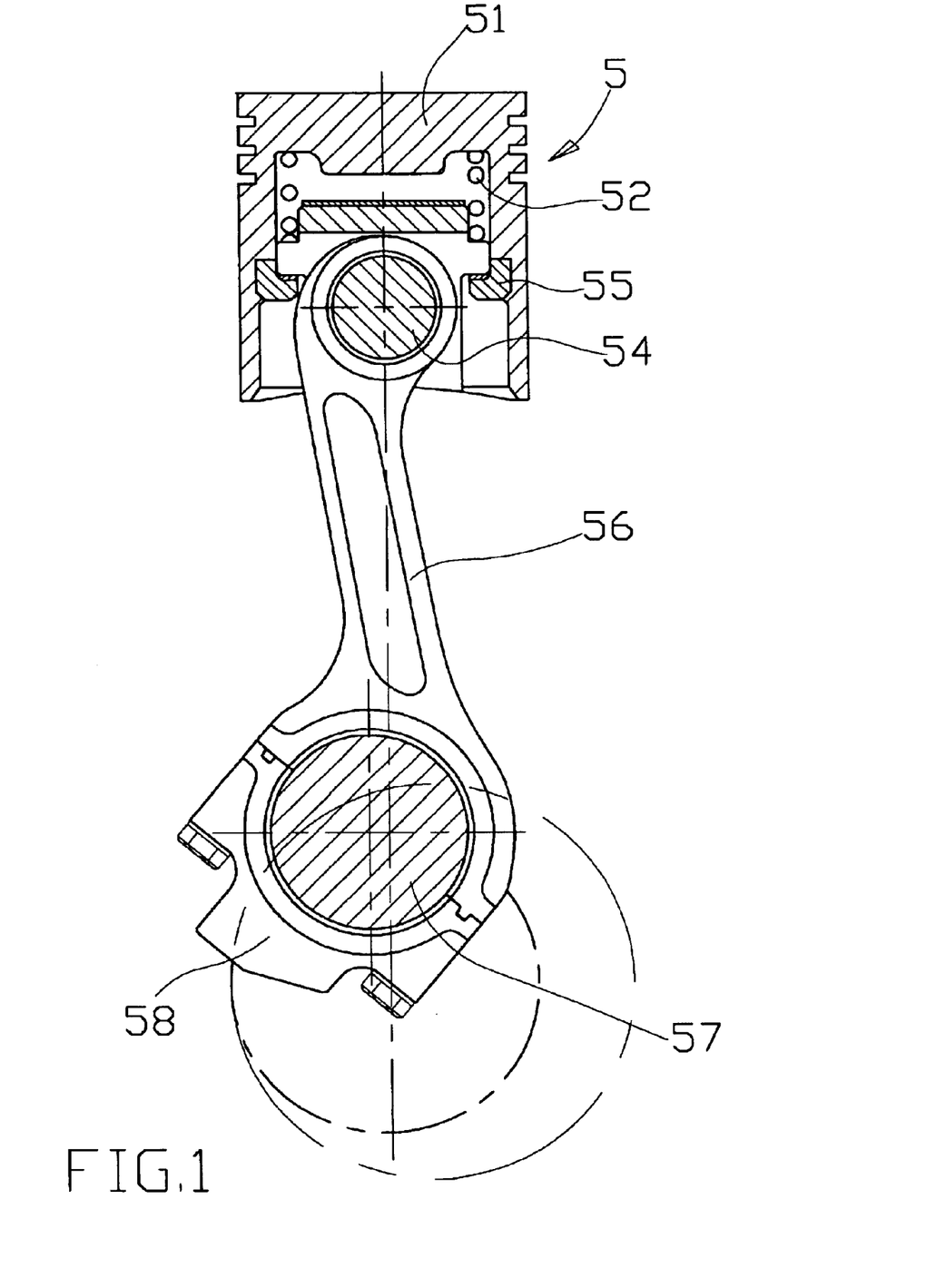
FIG. 1 is a sectional side plain view of the present invention.
Figure 2:
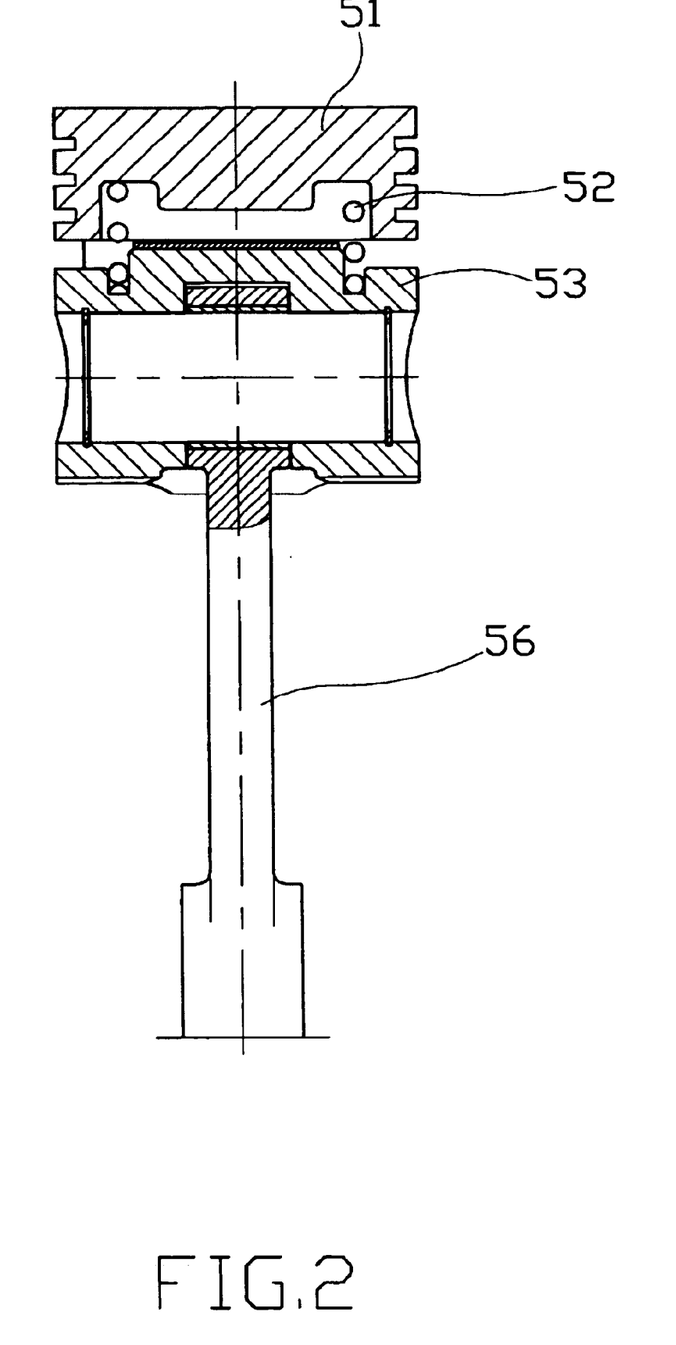
FIG. 2 is a sectional front view of the present invention.
Figure 3:
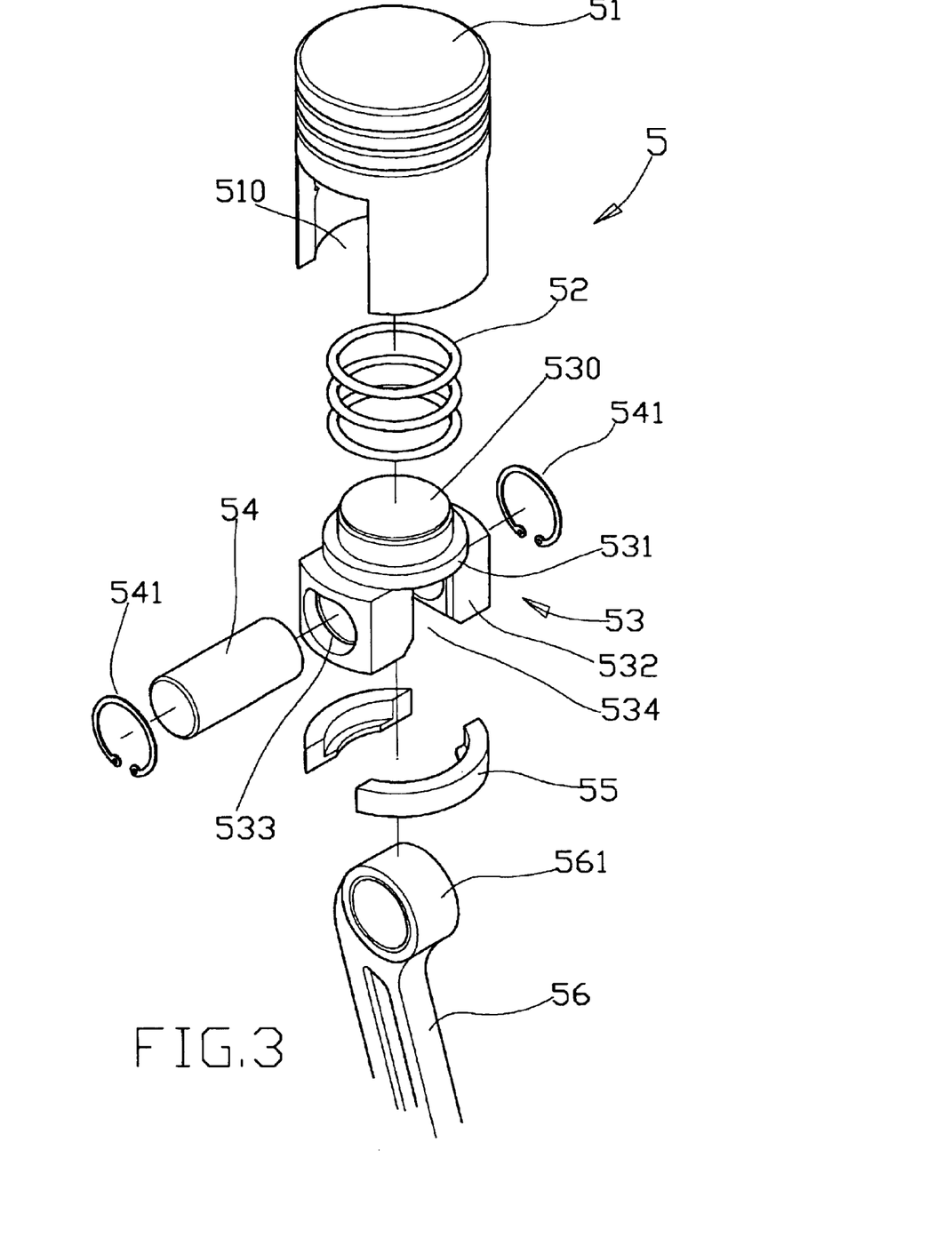
FIG. 3 is an exploded view of the present invention.
Figure 4:
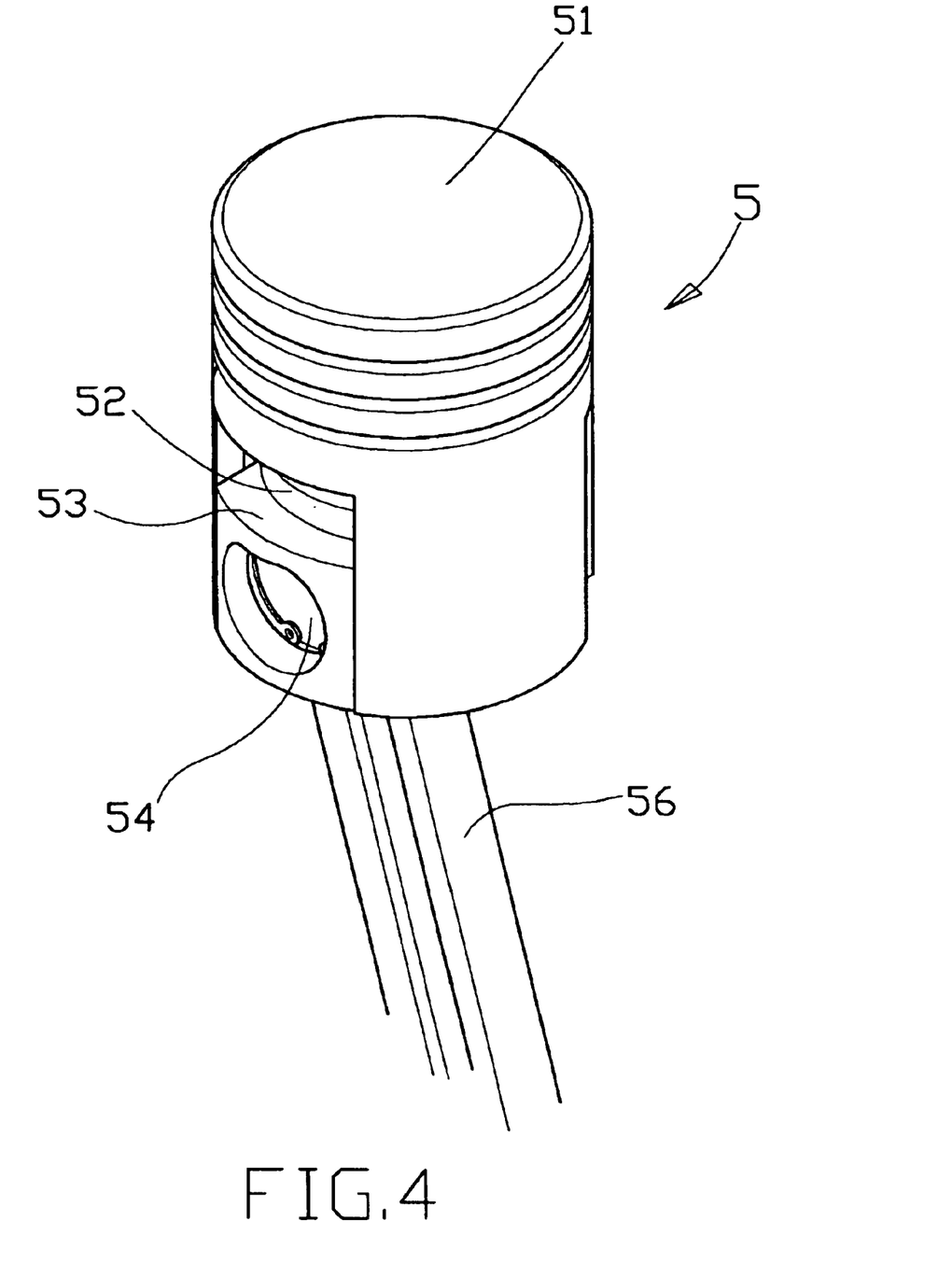
FIG. 4 is an elevational view of the present invention.

Referring to FIGS. 1~4, a spring-supported crankshaft coupling structure 2 is shown comprised of a piston 51, a spring member 52, a connector 53, a pivot pin 54, a stop device 55, and a connecting rod 56.

The piston 51 is a hollow member axially movably mounted in a cylinder (not shown) in an engine (not shown), having an opening 510 axially extended to the open bottom side thereof.

The spring member 52 according to the present preferred embodiment is a compression spring mounted in the hollow piston 51.

The connector 53 is axially movably mounted in the opening 510 of the hollow piston 51 at the bottom side of the spring member 52, having a round top head 530, which is inserted into the bottom side of the spring member 52, a circular stop flange 531, which is stopped below the spring member 52, two shoulders 532 symmetrically bilaterally suspended below the circular stop flange 531 and defining therebetween an opening 534, and two pivot holes 533 respectively formed in the shoulders 532 and axially aligned at two sides of the opening 534.

The pivot pin 54 is inserted through the pivot holes 533 in the shoulders 532 of the connector 53, and secured thereto by C-shaped retainer rings 541.

The stop device 55 is fixedly fastened to the bottom side of the piston 51 below the circular stop flange 531 of the connector 53, and adapted to limit the down stroke of the connector 53 relative to the piston 51. When moving the connector 53 downwards in the opening 510, the circular stop flange 531 of the connector 53 will be stopped at the stop device 55, and therefore the moving distance of the connector 53 relative to the piston 51 is limited.

The connecting rod 56 has a top eye end 561 inserted into the opening 534 between the shoulders 532 of the connector 53 and pivotally coupled to the shoulders 532 of the connector 53 by the pivot pin 54 (the pivot pin 54 is inserted into the pivot holes 533 in the shoulders 532 of the connector 53 and the top eye end 561 of the connecting rod 56 after insertion of the top eye end 561 of the connecting rod 56 into the opening 534 of the connector 53). The connecting rod 56 has its other end, namely, the bottom end pivotally connected to a crankshaft 58 by a crankshaft pivot pin 57.

Figure 5A:
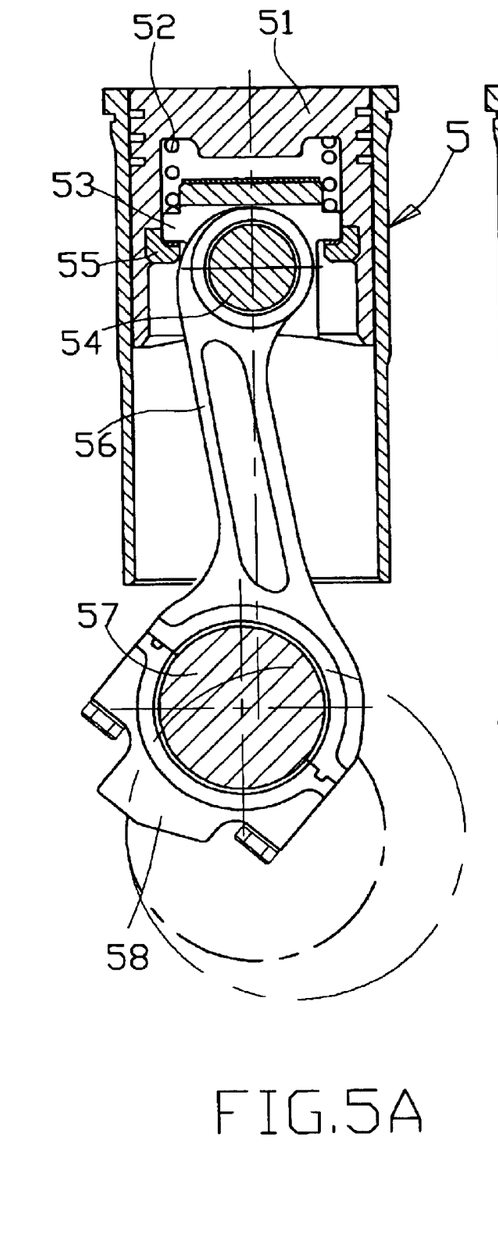
FIGS. 5A~5F are schematic drawings showing one moving cycle of the spring-supported crankshaft coupling structure with the piston from the top dead center to the bottom dead center and then from the bottom dead center back toward the top dead center according to the present invention.
Figure 5B:
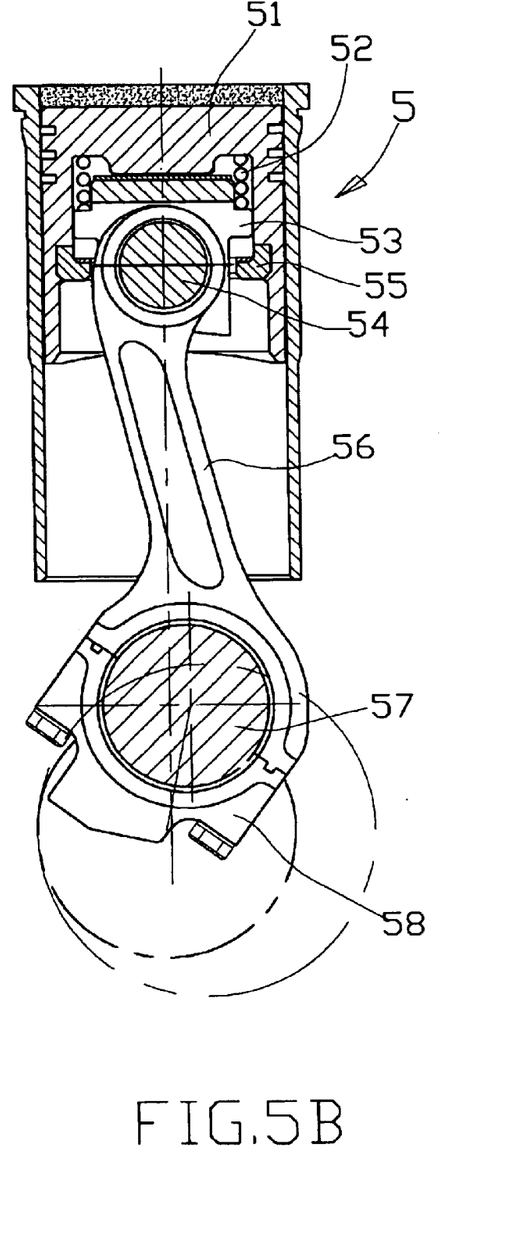
Figures 5C, 5D:
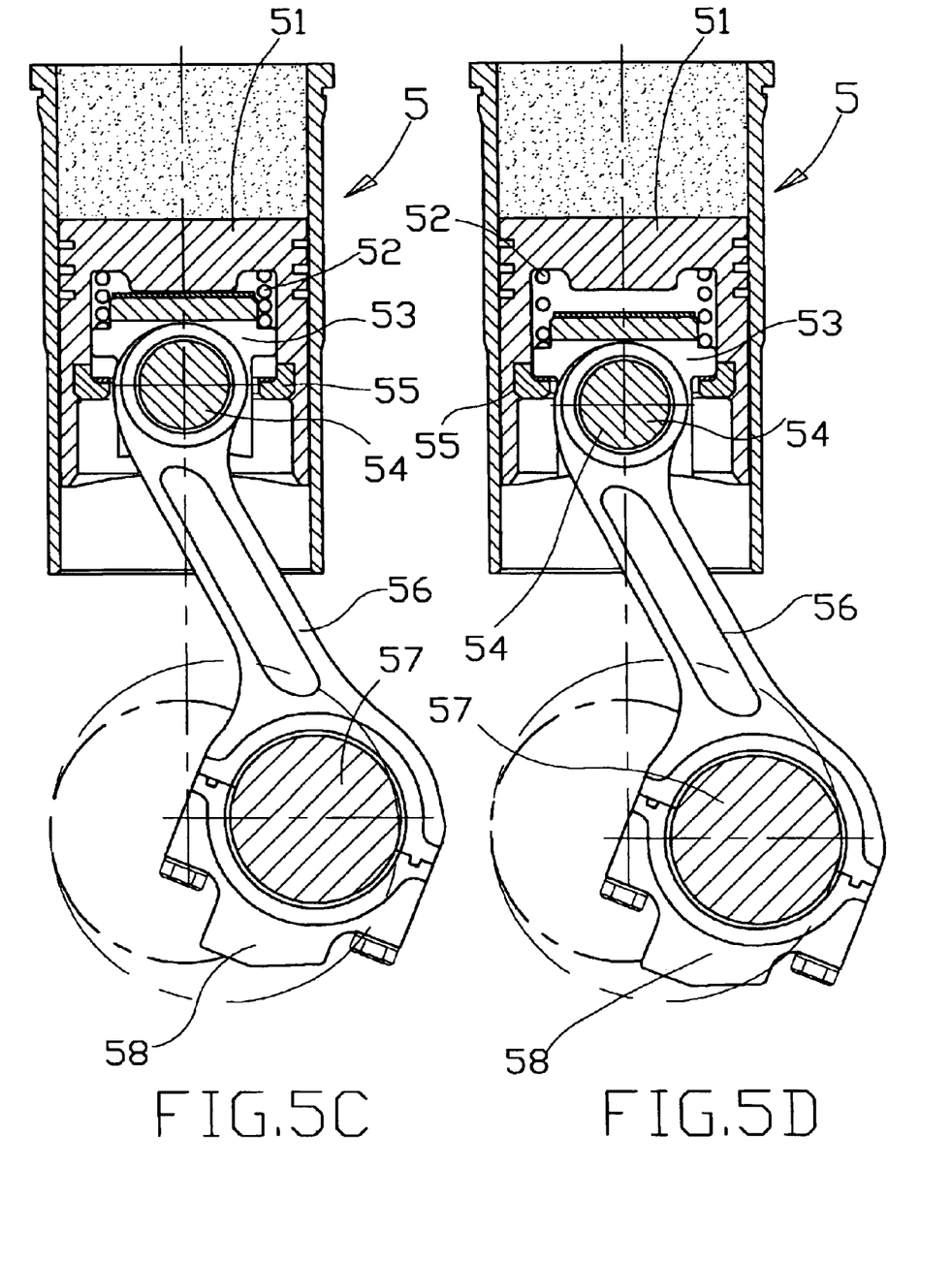

Referring to FIGS. 5A~5D, when the spring-supported crankshaft coupling structure 5 moved with the piston 51 to the top dead center in the combustion chamber, the connector 53 is lifted with the connecting rod 56 to compress the spring member 52. During the down stroke of the piston 51 from the top dead center in the combustion chamber toward the bottom dead center, the spring member 51 is released to force the connector 53 and the connecting rod 56 downwards relative to the piston 51. Therefore, the invention extends the stroke of the connecting rod 56, enhancing the output torque of the engine.

As indicated above, the spring-supported crankshaft coupling structure of the present invention uses a spring-supported connector to connect the crankshaft connecting rod to the piston through a slip joint. This arrangement greatly enhances the output torque of the engine. Because the invention greatly improves the performance of the engine, it makes the engine to save fuel consumption and to reduce waste gas production.

Figure 5E:
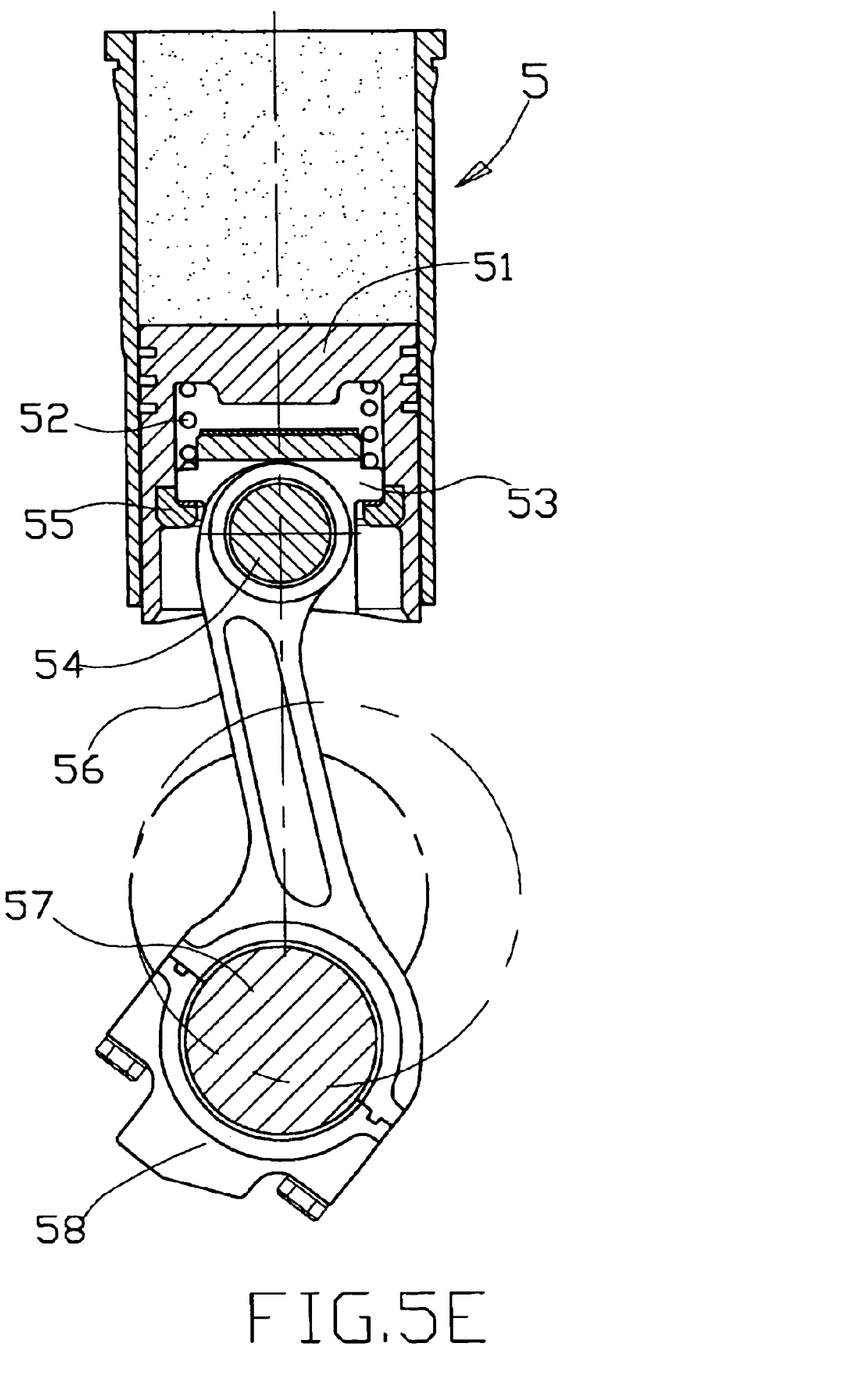
Figure 5F:
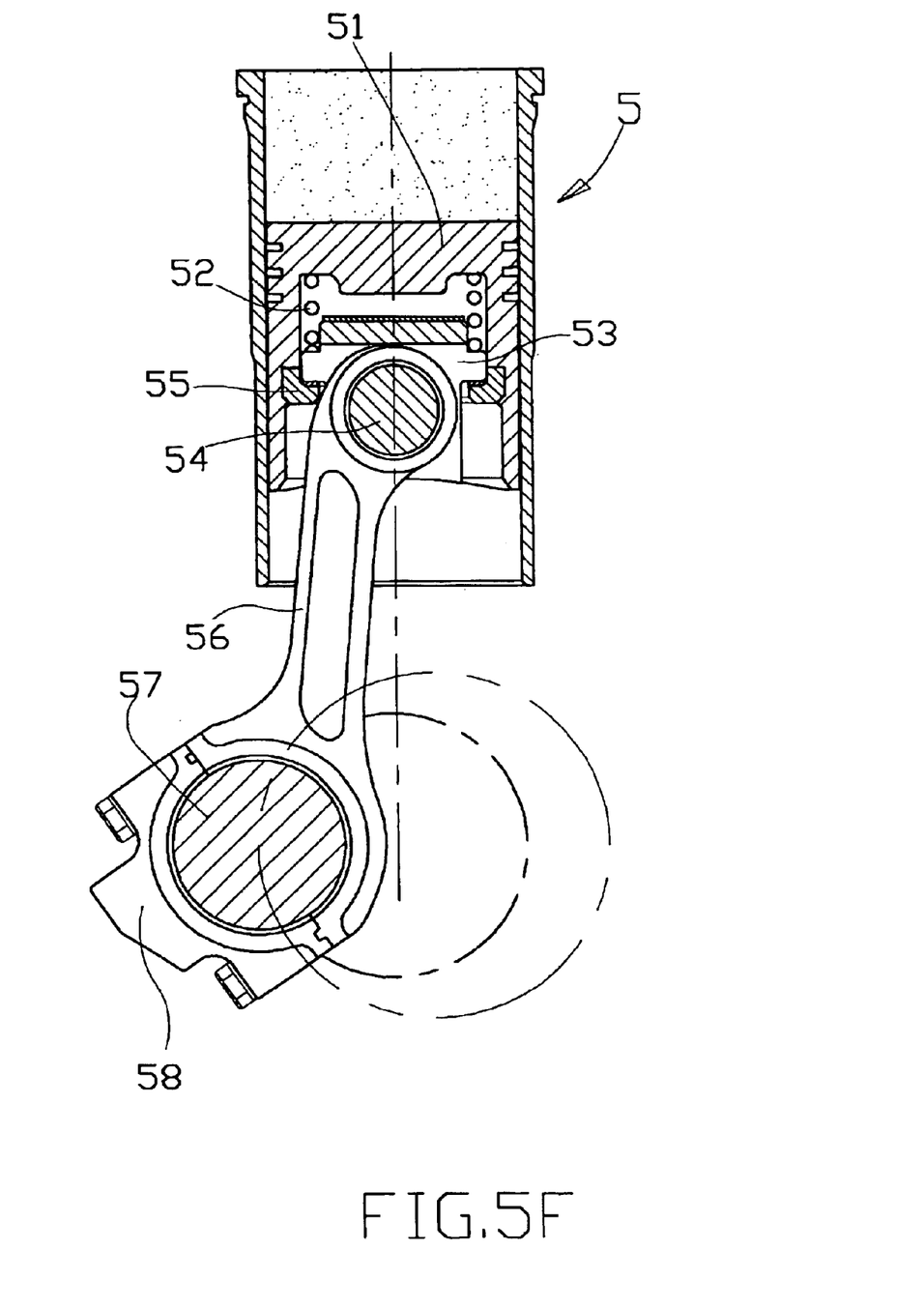

A prototype of spring-supported crankshaft coupling structure for engine has been constructed with the features of FIGS. 1~5. The spring-supported crankshaft coupling structure for engine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A spring-supported crankshaft coupling structure used in an engine and coupled between a piston and a crankshaft to enhance the output torque of the engine, comprising:

a connector mounted in said piston and axially movable relative to said piston, said connector being coupled to said piston within a limited distance;

a slip joint adapted to couple said connector to said piston;

a spring member mounted inside said piston and adapted to impart a pressure to said connector in axial direction toward a bottom side of said piston, said connector having a round top head connected to bottom side of said spring member;

a fixed stop device fixedly disposed in said piston and adapted to limit the movement of said connector relative to said piston to a predetermined distance, said connector including a circular stop flange, which is stopped below said spring member above said fixed stop device and adapted to stop at said fixed stop device upon a down stroke of said connector relative to said piston, said connector further including two shoulders symmetrically bilaterally suspended below said circular stop flange and coupled to said piston by said slip joint; and a connecting rod, said connecting rod having a top end pivoted to said connector and a bottom end pivoted to said crankshaft.

2. The spring-supported crankshaft coupling structure as claimed in claim 1, wherein said spring member is a compression spring.

* * * * *